(12) United States Patent
Jin (10) Patent No.: US 10,112,635 B1
(45) Date of Patent: Oct. 30, 2018

(54) FREIGHT CART

(71) Applicant: Xuancong Jin, Jinhua (CN)

(72) Inventor: Xuancong Jin, Jinhua (CN)

( * ) Notice: Subject to any disclaimer, the term of this patent is extended or adjusted under 35 U.S.C. 154(b) by 0 days.

(21) Appl. No.: 15/693,945

(22) Filed: Sep. 1, 2017

(30) Foreign Application Priority Data

Jul. 25, 2017 (CN) .......................... 2017 1 0609903
Jul. 25, 2017 (CN) ..................... 2017 2 0904458 U (51) Int. Cl.
| | | |
|---|---|---|
| *B60P 1/04* | (2006.01) | |
| *B62B 3/08* | (2006.01) | |
| *B62B 5/06* | (2006.01) | |
| *B60P 1/28* | (2006.01) | |

(52) U.S. Cl.
CPC ............... *B62B 3/08* (2013.01); *B60P 1/286* (2013.01); *B62B 5/06* (2013.01); *B62B 2203/70* (2013.01)

(58) Field of Classification Search
CPC ... B60P 1/286; B62B 3/08; B62B 5/06; B62B 2203/70; B62B 5/062

USPC ...... 298/1 C, 2, 3, 4, 10, 11, 19 B, 17 T, 38; 280/653, 47.31
See application file for complete search history.

(56) References Cited

U.S. PATENT DOCUMENTS 2,037,222 A * 4/1936 Farrar ....................... B62B 1/24
298/3
3,000,671 A * 9/1961 Monegato .............. A01D 90/12
298/10

* cited by examiner

*Primary Examiner* — Stephen T Gordon
(74) *Attorney, Agent, or Firm* — Chun-Ming Shih (57) ABSTRACT

The present invention provides a freight cart comprising a carriage as well as a bucket and a handle which are respectively located on front and rear sides of the carriage, the bucket is pivotally connected to the carriage, a double connecting rod assembly for driving the bucket to rotate relative to the carriage is also provided on the carriage, the double connecting rod assembly is pivotally connected to the bucket and the carriage respectively and forms a planar linkage mechanism together with the bucket and the carriage, the handle is transmissively connected to the double connecting rod assembly, and the handle is operated to make the planar linkage mechanism drivable to move the bucket relative to the carriage and switch the bucket between a storage position and a discharge position.

10 Claims, 4 Drawing Sheets

FREIGHT CART

CROSS REFERENCE TO RELATED APPLICATIONS

The present application claims a priority benefit of Chinese patent application No. 201710609903.3, filed on Jul. 25, 2017, contents of which are incorporated hereby in their entirety by reference.

FIELD OF THE INVENTION

The present invention relates to a field of freight machinery technology, and especially to a freight cart.

BACKGROUND OF THE INVENTION

At present, freight cart products in the market have a single structure, and when the existing freight carts are used for discharging, an operator needs to spend a lot of physical work to tilt buckets of the carts to dump the freights to complete a discharging operation. This discharging method has the following disadvantages: 1. since this discharging method is carried out in an upwardly lifting manner, and applying an upward force is a relatively laborious movement, physical effort consumption of the operator is very large in the discharging process; 2. in the discharging process, the operator can not guarantee that the force imposed on the cart is completely symmetrical, and falling over of the cart is liable to occur, so the discharging in this way also has a certain security risk; 3. when this discharging method is used for discharging, a forward force is also produced in a case where the upward force is applied, which will cause the discharging process to be is quite unstable and not safe because of shaking of the cart, as a result, a position of the cart has to be restricted to ensure that the cart will not move forwardly any longer in the discharging operation, resulting that the operator is desired to waste more physical effort in the discharging process.

SUMMARY OF THE INVENTION

In view of the technical problems existing in the prior art mentioned above, the present invention provides a freight cart which is labor-saving and has high safety.

A technical solution of the present invention resides in a freight cart comprising a carriage as well as a bucket and a handle which are respectively located on front and rear sides of the carriage, the bucket is pivotally connected to the carriage, a double connecting rod assembly for driving the bucket to rotate relative to the carriage is also provided on the carriage, the double connecting rod assembly is pivotally connected to the bucket and the carriage respectively and forms a planar linkage mechanism together with the bucket and the carriage, the handle is transmissively connected to the double connecting rod assembly, and the handle is operated to make the planar linkage mechanism drivable to rotate the bucket relative to the carriage and switch the bucket between a storage position and a discharge position.

Preferably, the handle is connected to the double connecting rod assembly by a main bar.

Preferably, the double connecting rod assembly includes a first connecting rod and a second connecting rod pivotally connected on one end, the other end of the first connecting rod is pivotally connected to the bucket, and the other end of the second connecting rod is pivotally connected to the carriage.

Preferably, one end of the main bar is fixed relative to the handle, and the other end of the main bar is transmissively connected to the other end of the second connecting rod.

Preferably, the double connecting rod assembly has two double connecting rod assemblies which are disposed symmetrically, and the main bar has two main bars which respectively correspond to the two double connecting rod assemblies.

Preferably, the freight cart further comprises a locking mechanism which is used to lock all of kinematic pairs of the planar linkage mechanism when the bucket is in the storage position.

Preferably, the locking mechanism includes a first locking member and a second locking member which cooperate with each other to implement locking, the first locking member being pivotally connected to the carriage, and the second locking member being fixed relative to the handle; and a locking flap is provided on the first locking member, a locking slot cooperating with the locking flap is provided in the second locking member, the locking flap is caught in the locking slot to implement locking between the first locking member and the second locking member when the bucket is located in the storage position, and the first locking member is operated to rotate about its pivotal shaft to enable the locking flap to come out of the locking slot and unlock the locking between the first locking member and the second locking member.

Preferably, a guide surface for guiding return of the locking flap is also provided on the second locking member, and the guide surface is connected to an opening of the locking slot.

Preferably, a stopper for stopping rotation of the first locking member and an elastic piece for driving the first locking member to return are also provided on the carriage.

Preferably, a support part which supports a free end of the bucket when the bucket is located in the storage position is also provided on the carriage.

Another technical solution of the present invention resides in a method of performing a discharging operation by use of the freight cart according to the present invention, comprising: pushing the freight cart to the discharge position and ensuring that the freight cart is stably parked in the discharge position; pulling a first locking member upwardly to release a locking flap from a locking slot of a second locking member and to unlock the locking between the first locking member and the second locking member; continuously pressing down the handle to drive a main bar to rotate downwardly so that the second connecting rod, the first connecting rod and the bucket are interlocked and the bucket is inclined forwardly to reach the discharge position; and keeping the bucket in the discharge position until the freight in the bucket is completely discharged from the bucket and finishing the discharging.

The present invention has the following advantages: the structure design of the invention is feasible, the double connecting rod assembly, the bucket and the carriage constitute the planar linkage mechanism, and by using the lever principle, the handle is operated to rotate relative to the carriage and drive the planar linkage mechanism to be interlocked to cause the bucket to rotate relative to the carriage so as to achieve the switching of the bucket between the storage position and discharge position. In the discharging process of the bucket, the carriage will not be inclined with the bucket but is stably fixed relative to the ground, hence in the discharging operation, no additional application of force is necessary to maintain stability of the carriage so that falling over of the cart due to tumbling of the carriage can be effectively prevented from occurring to ensure the safety of the discharging process. Since the carriage is stably fixed relative to the ground during the discharging operation and the stability of the carriage is not affected during the operation of the handle, and since an operating fulcrum of the handle is located on the carriage rather than the ground due to the lever principle, the operator applies a naturally symmetrical force to achieve the discharging operation, the handle is also easy to be operated effortlessly, and the discharging operation will not affect the stability of the carriage, will not affect the stability of the whole cart, will not lead to falling over of the cart, and can ensure the smooth and safe discharging operation and also shorten the operation time.

BRIEF DESCRIPTION OF THE DRAWINGS

In order to more clearly illustrate technical solutions of embodiments of the present invention or the prior art, the following drawings that are to be used in descriptions of the embodiments or the prior art will be briefly described. It will be apparent that the drawings in the description below are just some embodiments of the present invention, and other drawings may also be obtained based on these drawings by those skilled in the art without offering any creative work.

Reference numerals in the drawings: 1, carriage; 11, circular shaft; 12, fixing seat; 13, locking plate; 131, stopper; 132, support part; 14, support buffer; 15, longitudinal beam; 2, bucket; 21, base plate; 211, lug; 3, handle; 31, connecting bar; 32, main bars; 321, rotary head; 33, ratchet wheel shaft; 331, circular segment; 332, ratchet wheel segment; 3321, second ratchet teeth surface; 333, polygonal pyramid segment; 4, rear wheel assembly; 5, double connecting rod assembly; 51, first connecting rod; 52, second connecting rod; 521, connecting sleeve; 5211, first ratchet teeth surface; 61, first locking member; 611, locking flap; 62, second locking member; 621, operating part; 6211, locking slot; 622, holding hoop; 63, tension spring; 7 front wheel assembly.

DETAILED DESCRIPTION OF THE PREFERRED EMBODIMENTS

The existing freight cart products have a single structure, and when the existing freight carts are used for discharging, there are the following disadvantages:

1. since this discharging method is carried out in an upwardly lifting manner, and applying an upward force is a relatively laborious movement, physical effort consumption of the operator is very large in the discharging process;

2. in the discharging process, the operator can not guarantee that the force imposed on the cart is completely symmetrical, and falling over of the cart is liable to occur, so the discharging in this way also has a certain security risk;

3. when this discharging method is used for discharging, a forward force is also produced in a case where the upward force is applied, which will cause the discharging process to be is quite unstable and not safe because of shaking of the cart, as a result, a position of the cart has to be restricted to ensure that the cart will not move forwardly any longer in the discharging operation, resulting that the operator is desired to waste more physical effort in the discharging process.

In view of the technical problems existing in the prior art mentioned above, an embodiment of the present invention provides a freight cart comprising a carriage as well as a bucket and a handle which are respectively located on front and rear sides of the carriage, the bucket is pivotally connected to the carriage, a double connecting rod assembly for driving the bucket to rotate relative to the carriage is also provided on the carriage, the double connecting rod assembly is pivotally connected to the bucket and the carriage respectively and forms a planar linkage mechanism together with the bucket and the carriage, the handle is transmissively connected to the double connecting rod assembly, and the handle is operated to make the planar linkage mechanism drivable to rotate the bucket relative to the carriage and switch the bucket between a storage position and a discharge position.

The structure design of the present invention is feasible, the double connecting rod assembly, the bucket and the carriage constitute the planar linkage mechanism, and by using the lever principle, the handle is operated to rotate relative to the carriage and drive the planar linkage mechanism to be interlocked to cause the bucket to rotate relative to the carriage so as to achieve the switching of the bucket between the storage position and discharge position. In the discharging process of the bucket, the carriage will not be inclined with the bucket but is stably fixed relative to the ground, hence in the discharging operation, no additional application of force is necessary to maintain stability of the carriage so that falling over of the cart due to tumbling of the carriage can be effectively prevented from occurring to ensure the safety of the discharging process. Since the carriage is stably fixed relative to the ground during the discharging operation and the stability of the carriage is not affected during the operation of the handle, and since an operating fulcrum of the handle is located on the carriage rather than the ground due to the lever principle, the operator applies a naturally symmetrical force to achieve the discharging operation, the handle is also easy to be operated effortlessly, and the discharging operation will not affect the stability of the carriage, will not affect the stability of the whole cart, will not lead to falling over of the cart, and can ensure the smooth and safe discharging operation and also shorten the operation time.

The bucket, the carriage, the storage position and the discharge position that have been mentioned above or will be described below are defined as follows:

the bucket is a container that has an cavity for storage opened upwardly therein;

the carriage is a support structure that supports the bucket and is used to mount components such as wheels;

the storage position refers a position in which the bucket is located and opened upwardly in the process of loading and shipping; and the discharge position refers to a position in which the bucket is inclined forwardly and all the freight in the bucket leaves the bucket by its own gravity.

The technical solution of the present invention will be described in detail below in order to make objects, solutions and advantages of the present invention clearer. Obviously, the described embodiments are merely a part and not all embodiments of the present invention.

Accordingly, the following detailed description of the embodiments of the invention provided in the accompanying drawings is not intended to limit the scope of the invention as claimed, but merely to show a selected embodiment of the invention. Based on embodiments in the present invention, all of other embodiments obtained by those of ordinary skill in the art without making creative work are within the scope of the present invention.

It should be noted that similar reference numerals and letters denote similar items in the accompanying drawings, and therefore, once an item is defined in a drawing, it is not necessary to further define and explain it in the accompanying drawings.

In the description of the present invention, it is to be understood that the orientation or positional relationship indicated by the terms "upper", "lower", "left", "right" and the like is based on the orientation or positional relationship shown in the drawings, or the orientation or positional relationship that is conventionally placed when the invention is used in the product, or the orientation or positional relationship that is conventionally understood by those skilled in the art, is for the purpose of facilitating the description of the invention and the simplified description, rather than indicating or implied that the device or element have a specific orientation, constructed and operated in a particular orientation, and therefore can not be construed as limiting of the invention.

In the description of the present invention, it is to be understood that the terms "provide", "mount", should be broadly understood, unless otherwise expressly defined and defined, for example, either a fixed connection, a detachable connection, or connected integrally. For those skilled in the art, the specific meaning of the above terms in the present invention may be understood according to circumstances.

Embodiment 1

As shown in FIGS. 1 to 7, an embodiment of the present invention provides a freight cart comprising a carriage 1 as well as a bucket 2 and a handle 3 respectively located on front and rear sides of the carriage 1.

Figure 7:
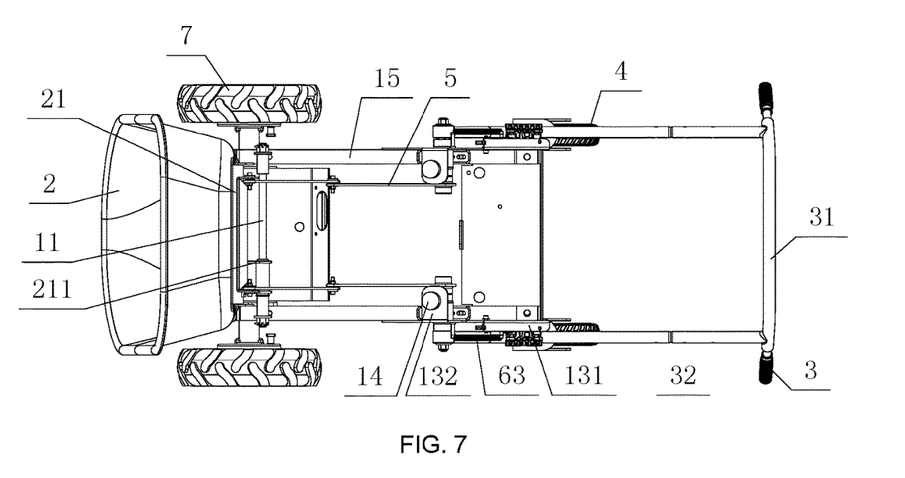
FIG. 7 is a top view of the embodiment of the present invention in the discharging state.

In the present embodiment, as shown in FIG. 7, the carriage 1 includes two longitudinal beams 15 arranged symmetrically and parallelly that are connected and fixed on front and rear ends respectively to form a rectangular frame structure, a front wheel assembly 7 is connected to the front ends of the two longitudinal beams 15, and a rear wheel assembly 4 is connected to the rear ends of the two longitudinal beams 15. Each of the front wheel assembly 7 and the rear wheel assembly 4 comprises two wheels, i.e., the freight cart of the present embodiment is a four-wheel cart that travels stably.

The bucket 2 is located above the front wheel assembly 7.

The bucket 2 is pivotally connected with the carriage 1. Specifically, as shown in FIGS. 1 and 2, the bucket 2 is detachably mounted on a base plate 21, and the base plate 21 is pivotally connected to the carriage 1 through a first pivoting member.

The base plate 21 has a shape conforming to the bottom of the bucket 2, through holes are formed corresponding to each other in the base plate 21 and at the bottom of the bucket 2, and a detachable connection between the base plate 21 and the bucket 2 is achieved by a bolt-nut assembly (including a bolt, a nut, gaskets, etc.) running through the through holes of the the base plate 21 and the bucket 2. With this structure, it is possible to facilitate replacement and maintenance of the bucket 2, since the bucket 2 is a component that is in direct contact with the freight and it is liable to wear after long-term use to reduce a load bearing strength or even incur a damage, and it is only required to detach the bucket 2 and mount a new one to complete the maintenance. Also, the connection between the bucket 2 and the carriage 1 is achieved by providing the base plate 21, and this also has a protective effect on the bucket 2. During turnover of the bucket 2, a torsional stress in a pivotally connected position is born by the base plate 21 and will not be directly transmitted to the bucket 2 so that a useful life of the bucket 2 is avoided to be affected by deformation of the bucket 2 due to the torsional stress, and thus overall structural stability of the freight cart according to the embodiment of the present invention is enhanced. Edgefolds are provided on left and right sides of the base plate 21 to enhance a structural strength of the base plate 21.

Figure 1:
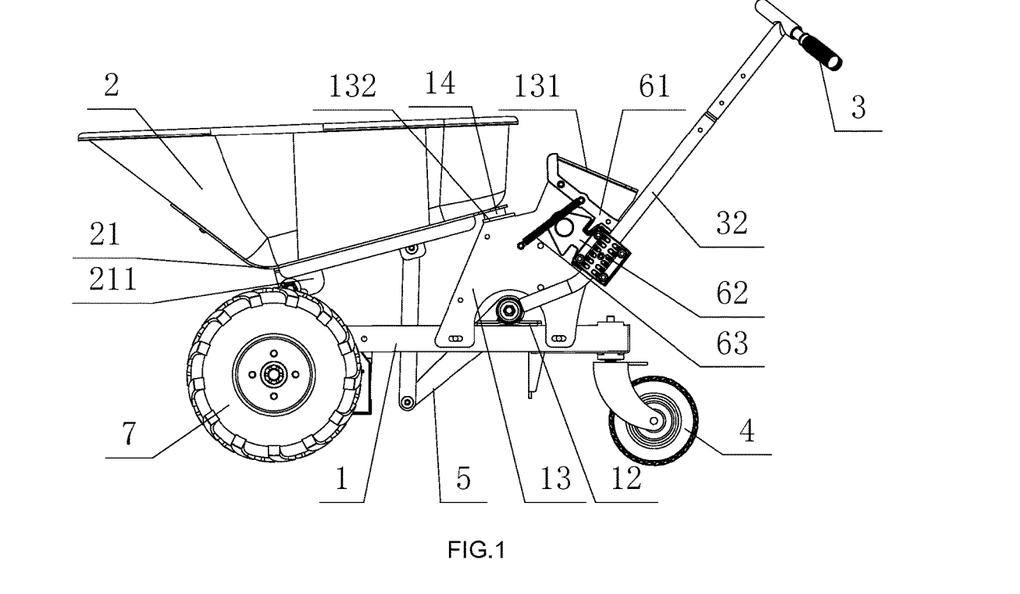
FIG. 1 is a schematic view showing a structure of an embodiment of the present invention.
Figure 2:
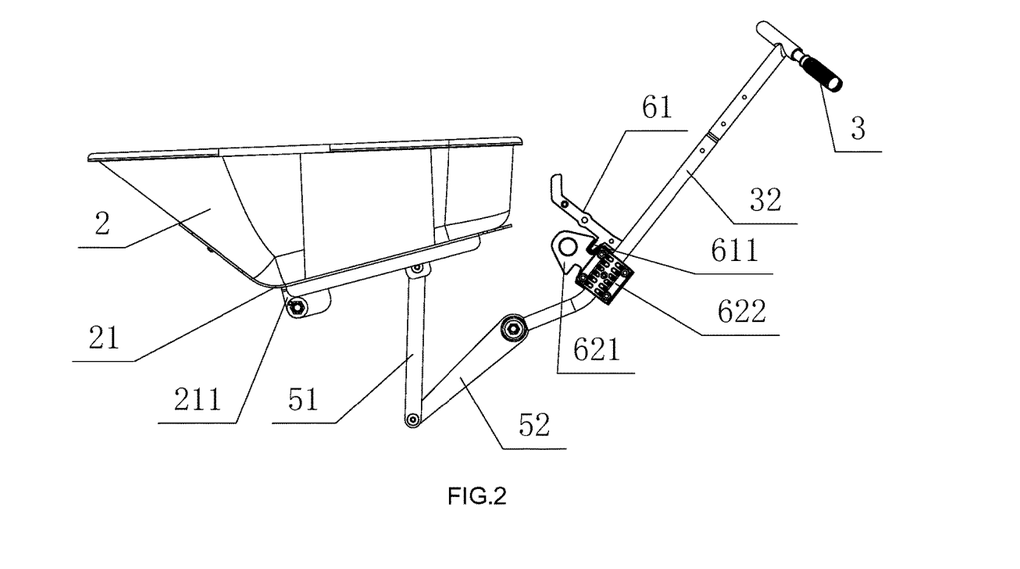
FIG. 2 is a schematic view showing a connection of a bucket, double connecting rod assembly and a main bar in the embodiment of the present invention.
Figure 3:
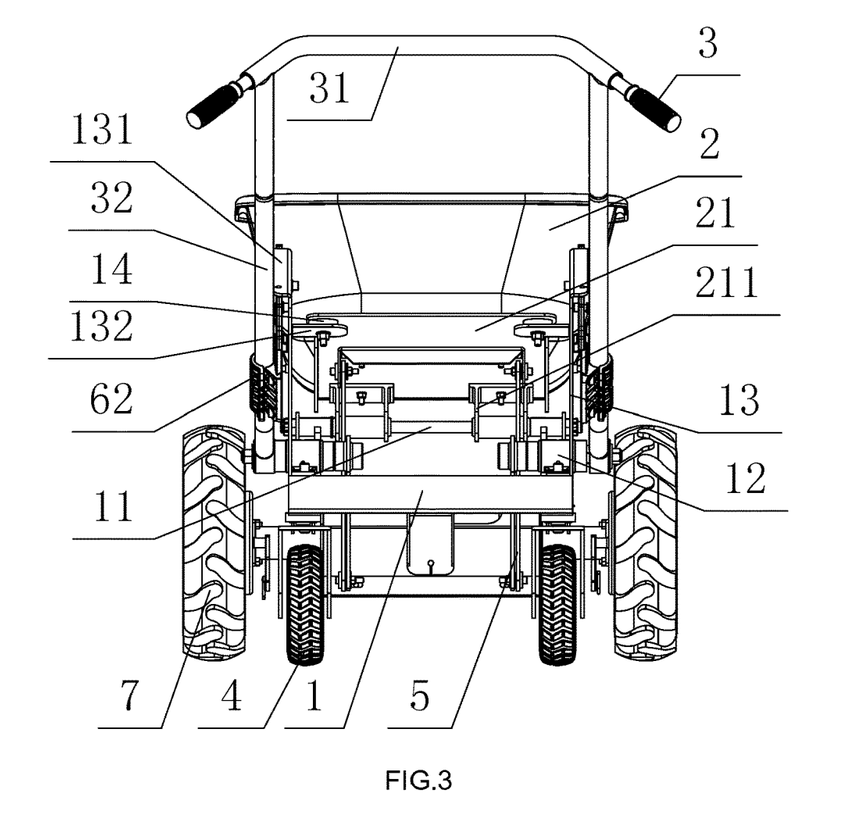
FIG. 3 is a right view of the embodiment of the present invention.

In the present embodiment, as shown in FIGS. 1 to 3, the first pivoting member includes a lug 211 and a circular shaft 11, and the lug 211 is fixed to the base plate 21 by welding or bolting, etc. In the present embodiment, the lugs 211 are fixedly welded to the base plate 21. A first bush is fixedly welded to the lug 211. The number of the lug 211 is at least one, and when the number of the lug 211 is set to be plural, it is possible to further ensure that a pivotal structure between the base plate 21 and the carriage 1 is stable, and first rotary bushes on all of the lugs 211 are provided coaxially. In the present embodiment, the number of the lug 211 is two, and the two lugs 211 are welded to the base plate 21 in a symmetrical distribution. The circular shaft 11 passes through the two first bushes.

A second bush coaxial with the first bush is fixedly provided on a front end of the carriage 1, the second bush has two second bushes arranged symmetrically, and the two second bushes are respectively fixed to the two longitudinal beams 15 of the carriage 1. The two first bushes are located between the two second bushes, and the circular shaft 11 extends through the two first bushes and the two second bushes concurrently. Both ends of the circular shaft 11 extend out of the two second bushes respectively, external threads are machined on portions protruding from the second bushes of the both ends of the circular shaft 11 to form two external thread segments, and radial pin holes are machined on the external thread segments. After the circular shaft 11 is mounted relative to the first and second bushes, a gasket and a hexagonal slotted nut are mounted in order on each of the two external thread segments, and then split pins are inserted in the pin holes to prevent the hexagonal slotted nuts from being loosened from the thread segments of the circular shaft 11.

A double connecting rod assembly 5 for driving the bucket 2 to rotate relative to the carriage 1 is also provided on the carriage 1, the double connecting rod assembly 5 is pivotally connected to the bucket 2 and the carriage 1 respectively and constitutes a planar linkage mechanism together with the bucket 2 and the carriage 1.

In the present embodiment, as shown in FIG. 2, the double connecting rod assembly 5 is composed of a first connecting rod 51 and a second connecting rod 52 pivotally connected on one end. The other end of the first connecting rod 51 is pivotally connected to the base plate 21 (i.e., to the bucket 2), and the other end of the second connecting rod 52 is pivotally connected with the carriage 1. A position in which the first connecting rod 51 and the base plate 21 are pivotally connected is located at the rear of a position in which the base plate 21 and the carriage 1 are pivotally connected. A position in which the first connecting rod 51 and the second connecting rod 52 are pivotally connected is located below a position in which the first connecting rod 51 and the base plate 21 are pivotally connected, and when the bucket 2 is in a storage position, an acute angle is formed between the first connecting rod 51 and the second connecting rod 52. In this way, when the first connecting rod 51 is unfolded relative to the second connecting rod 52, a rear end of the bucket 2 is raised upwardly and forwardly so that the bucket 2 rotates about the circular shaft 11 to be inclined forwardly until a discharge position is reached.

The handle 3 is transmissively connected to the double connecting rod assembly 5, and the handle 3 is operated to make the planar linkage mechanism drivable to rotate the bucket 2 relative to the carriage 1 and switch the bucket 2 between the storage position and the discharge position.

In the present embodiment, the handle 3 is connected to the double connecting rod assembly 5 through a main bar 32. The handle 3 has two handles arranged symmetrically, and the two handles 3 are integrally connected by a connecting bar 31.

In the present embodiment, as shown in FIG. 2, the double connecting rod assembly 5 has two double connecting rod assemblies arranged symmetrically and parallelly. The other end of each of the second connecting rods 52 of the two double connecting rod assemblies 5 is pivotally connected with a portion near the rear end of respective one of the two longitudinal beams 15 of the carriage 1.

Accordingly, the main bar 32 has two main bars which correspond to the two double connecting rod assemblies 5. One end of each of the two main bars 32 is fixedly connected to the connecting bar 31 to enable the handles 3 to be fixed relative to the main bars 32, and the other end of each of the main bars 32 is transmissively connected to the second connecting rod 52 of respective one of the double connecting rod assemblies 5.

Both of the double connecting rod assemblies 5 are located between the two longitudinal beams 15, and both of the main bars 32 are located on outer sides of the two longitudinal beams 15, i.e., each main bar 32 and its corresponding double connecting rod assembly 5 are respectively located on both sides of the respective longitudinal beam 15. One fixing seat 12 is fixedly provided on each of the longitudinal beams 15, a mounting hole is opened in the fixing seat 12, the fixing seats 12 on the two longitudinal beams 15 are arranged symmetrically, and the mounting holes of the two fixing seats 12 are provided coaxially.

Figure 4:
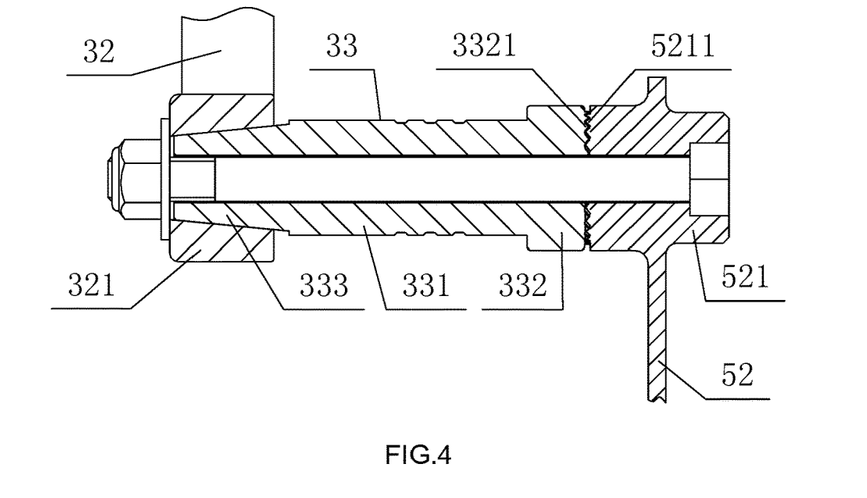
FIG. 4 is a schematic view showing a structure of a connection between the double connecting rod assembly and the main bar in the embodiment of the present invention.

As shown in FIG. 4, a connecting sleeve 521 is integrally provided on one end of the second connecting rod 52 away from the first connecting rod 51 of each of the double connecting rod assemblies 5, the connecting sleeve 521 is coaxial with the mounting holes of the fixing seats 12, and an end surface of the connecting sleeve 521 facing the fixing seats 12 is a first ratchet teeth surface 5211 on which a first ratchet teeth distributed in a circumferential array are provided.

Ratchet wheel shafts 33 are rotatably connected in the mounting holes, and each of the ratchet wheel shafts 33 includes a circular segment 331 rotatably cooperating with the mounting holes as well as a ratchet wheel segment 332 and a polygonal pyramid segment 333 respectively located on both ends of the circular segment 331, wherein a diameter of the ratchet wheel segment 332 is greater than a diameter of the circular segment 331, and a maximum diameter of a circumscribed circle of the polygonal pyramid segment 333 is less than or equal to the diameter of the circular segment 331.

An end surface of the ratchet wheel segment 332 away from the circular segment 331 is a second ratchet teeth surface 3321 on which a second ratchet teeth distributed in a circumferential array is provided, and the second ratchet teeth surface 3321 meshes with the first ratchet teeth surface 5211 of the connecting sleeve 521.

A shaft hole extending through both ends of the ratchet wheel shaft 33 is also machined inside the ratchet wheel shaft 33, and a diameter of the shaft hole is the same as a diameter of an inner bore of the connecting sleeve 521. A hexagonal blind hole is also machined on an end face of the connecting sleeve 521 away from the first ratchet teeth surface 5211.

A rotary head 321 is fixedly provided on one end of each of the main bars 32 away from the handles 3, a polygonal pyramid hole cooperating with the polygonal pyramid segment 333 of the ratchet wheel shaft 33 is opened in the rotary head 321 and extends through both ends of the rotary head 321, and large and small ends of the polygonal pyramid hole are smaller than those of the polygonal pyramid segment 333 so that firmness of a connection between the rotary head 321 and the ratchet wheel shaft 33 can be achieved when the polygonal pyramid segment 333 passes through the polygonal pyramid hole. In the present embodiment, each of the polygonal pyramid hole and the polygonal pyramid segment 333 has a section in a regular hexagon.

In mounting, the rotary head 321 on the main bar 32 and the connecting sleeve 521 on the second connecting rod 52 are respectively located on both sides of each fixing seat 12, and the circular segment 331 of the ratchet wheel shaft 33 passes through the mounting hole of the fixing seat 12, and the second ratchet teeth surface 3321 of the ratchet wheel segment 332 of the ratchet wheel shaft 33 meshes with the first ratchet teeth surface 5211 of the connecting sleeve 521 to form a transmissive fit. The polygonal pyramid segment 333 protrudes into the polygonal pyramid hole of the rotary head 321, and the rotary head 321, the ratchet wheel shaft 33 and the connecting sleeve 521 are tightly locked by causing a bolt to be connected to a gasket and a nut after the bolt passes through the rotary head 321, the ratchet wheel shaft 33 and the connecting sleeve 521 to form a transmissive connection between the main bar 32 and the second connecting rod 52, and to simultaneously form a pivotal connection between the second connecting rod 52 and the longitudinal beam 15, i.e., to form a pivotal connection between the second connecting rod 52 and the carriage 1.

With the above structure, the transmissive connection between the main bar 32 and the second connecting rod 52 is achieved and the pivotal connection between the second connecting rod 52 and the longitudinal beam 15 is achieved as well, not only it is ensured that the second connecting rod 52 is interlocked with the main bar 32 as the handles 3 are operated but also the torsional stress born by the second connecting rod 52 can be relieved by the cooperation between the ratchet wheel shaft 33 and the connecting sleeve 521 to prolong a useful life of the double connecting rod assembly 5.

In order to make the rotation between the second connecting rod 52 and the carriage 1 more smooth, it is also possible to mount a bearing between the mounting hole of the fixing seat 12 and the circular section 331 of the ratchet wheel shaft 33, and to add a gasket and/or a washer on the ratchet wheel shaft 33 depending on a length of the ratchet wheel shaft 33 and a length relationship between the ratchet wheel shaft 33 and the fixing seat 12 to ensure stability of the transmissive connection between the second connecting rod 52 and the main bar 32.

The freight cart according to the present embodiment of the present invention further includes a locking mechanism that is used to lock all of kinematic pairs of the planar linkage mechanism when the bucket 2 is in the storage position.

As shown in FIGS. 1, 2, 5 and 6, the locking mechanism includes a first locking member 61 and a second locking member 62 which cooperate with each other to achieve locking. The first locking member 61 is of along stripped structure, one end of which is a stop end and the other end of which is a lock end, and a locking flap 611 protruding toward one side is provided on the lock end. The second locking member 62 has an operating part 621 on which a locking slot 6211 cooperating with the locking flap 611 is provided.

The first locking member 61 is pivotally connected to the carriage 1, and the second locking member 62 is fixed relative to the handles 3. The locking flap 611 is caught in the locking slot 6211 to implement locking between the first locking member 61 and the second locking member 62 when the bucket 2 is located in the storage position, and the first locking member 61 is operated to rotate about its pivotal shaft to enable the locking flap 611 to come out of the locking slot 6211 and unlock the locking between the first locking member 61 and the second locking member 62.

At least one locking mechanism is provided, two locking mechanisms are correspondingly provided in this embodiment according to the number (two) of the main bars 32 to achieve a more stable locking effect, and the two locking mechanisms are arranged symmetrically.

Specifically, as shown in FIGS. 1, 3, 5 and 7, two locking plates 13 are symmetrically provided on the carriage 1, and the two locking plates 13 are fixedly mounted on the two longitudinal beams 15 respectively. Each of the locking plates 13 is located between the double connecting rod assembly 5 and the main bar 32 which are transmissively connected to each other. Each of the locking mechanisms is located on a side of the locking plate 13 opposing the double connecting rod assembly 5.

The first locking member 61 is located above a position in which the second connecting rod 52 and the longitudinal beam 15 are pivotally connected. The first locking member 61 is pivotally connected to the locking plate 13, a position in which the first locking member 61 and the locking plate 13 are pivotally connected is located in a portion of the first locking member 61 close to the stop end, and a pivotal shaft of the first locking member 61 is parallel to that of the second connecting rod 52. When the locking mechanism is in a locking state, the stop end of the first locking member 61 is higher than the lock end thereof, the stop end is located at the front of the lock end, and the locking flap 611 is inclined downwardly toward the front of the carriage 1.

The second locking member 62 also has a holding hoop 622 provided on a side of the operating part 621, and the second locking member 62 is fixedly mounted on the corresponding main bar 32 by the holding hoop 622. When the locking mechanism is in the locking state, the second locking member 62 is located below the first locking member 61, and the locking flap 611 is caught in the locking slot 6211. An opening of the locking slot 6211 is inclined upwardly toward the rear of the carriage 1 and cooperates with the locking flap 611, and the first locking member 61 is caused to rotate about its pivotal shaft by pulling the lock end of the first locking member 61 upward to enable the locking flap 611 to come out of the locking slot 6211 to implement the unlocking operation between the first locking member 61 and the second locking member 62. After the first locking member 61 and the second locking member 62 are unlocked, the handles 3 can be operated downward to rotate the main bar 32 downwardly with an axis of the mounting hole of the fixing seat 12 as a rotary shaft, the second connecting rod 52 is driven to rotate upwardly, and thus the first connecting rod 51 is interlocked to raise the rear end of the bucket 2 upwardly so that the bucket 2 rotates and is inclined forwardly to the discharge position.

Figure 6:
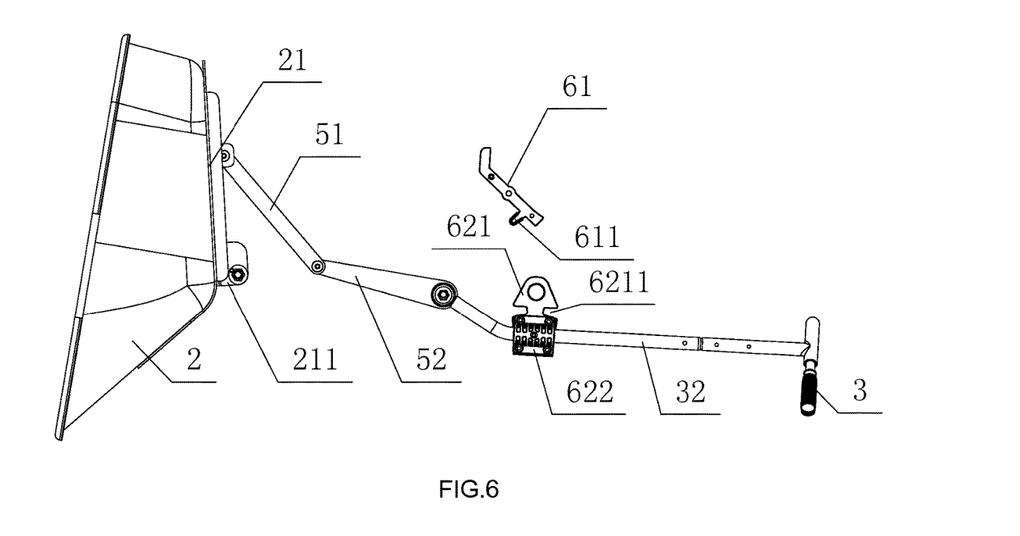
FIG. 6 is a schematic view showing a connection among the bucket, the double connecting rod assembly and the main bar in the embodiment of the present invention in a discharging state.

As shown in FIGS. 2 and 6, the operating part 621 of the second locking member 62 is also provided with a guide surface that is connected to the opening of the locking slot 6211. The guide surface is a surface for guiding return of the locking flap 611, and the guide surface is connected to the opening of the locking slot 6211. When discharging is finished, the handles 3 are lifted upward to rotate the main bar 32 upward, and the second locking member 62 returns upwardly along with the main bar 32. At first, the guide surface is in contact with the locking flap 611, the locking flap 611 rotates upwardly while being pushed by the guide surface, and at the same time, the locking flap 611 slides along the guide surface until the locking flap 611 reaches the opening of the locking slot 6211. As the main bar 32 continues to rotate upwardly, the locking flap 611 is caught in the locking slot 6211. In order to ensure that the locking flap 611 can be automatically caught into the locking slot 6211 during the upward rotation of the main bar 32, an elastic piece for driving the first locking member 61 to return is also provided on the locking plate 13. The elastic piece may be a torsion spring nested on the pivotal shaft of the first locking member 61, and in the present embodiment, the elastic piece is a tension spring 63, one end of which is fixed to a middle portion of the first locking member 61, and the other end of which is inclined forwardly and fixed to the locking plate 13, the other end of the tension spring 63 fixed to the locking plate 13 being located below the first locking member 61.

A stopper 131 constituted by a flanging formed by being bent opposite to the double connecting rod assembly 5 is provided on the top of the locking plate 13 to stop rotation of the first locking member 61.

A support part 132 that supports a free end of the bucket 2 when the bucket 2 is located in the storage position is also provided on a front end of the locking plate 13. The rear end of the bucket 2 is the free end of the bucket 2. The support part 132 is also provided with a support buffer 14 for buffering an impact force between the bucket 2 and the support part 132 when the bucket 2 returns. In the present embodiment, the bucket 2 is fixedly mounted on the base plate 21, and a rear end of a bottom surface of the base plate 21 keeps touch with the support buffer 14 when the bucket 2 is in the storage position. The support buffer 14 may also buffer pressure imposed on the carriage 1 by the bucket 2 when the freight is loaded in the bucket 2. The support buffer 14 may be made of plastics, rubbers or the like.

Figure 5:
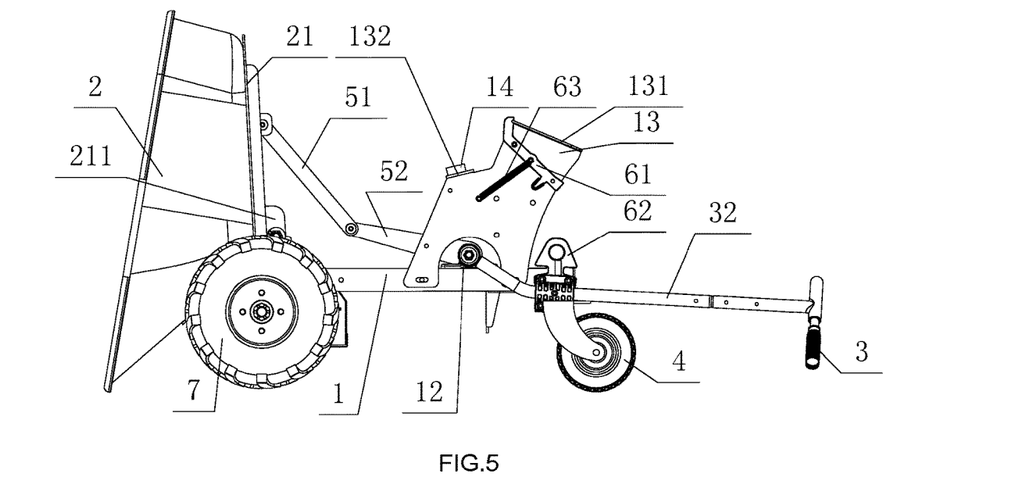
FIG. 5 is a schematic view of the structure of the embodiment of the present invention in a discharging state.

A method of performing a discharging operation by use of the freight cart according to the present embodiment of the present invention is given as follows:

1. pushing the freight cart to the discharge position and ensuring that the freight cart is stably parked in the discharge position;
2. pulling the first locking member 61 upwardly to release the locking flap 611 from the locking slot 6211 of the second locking member 62 and to unlock the locking between the first locking member and the second locking member;
3. continuously pressing down the handle 3 to drive the main bar 32 to rotate downwardly so that the second connecting rod 52, the first connecting rod 51 and the bucket 2 are interlocked and the bucket 2 is inclined forwardly to reach the discharge position, as shown in FIGS. 5 to 7; and
4. keeping the bucket 2 in the discharge position until the freight in the bucket 2 is completely discharged from the bucket 2 and finishing the discharging.

After the discharging is finished, a method of causing the bucket 2 to return is as follows:

continuously lifting the handle 3 up to drive the main bar 32 to rotate upwardly so that the second connecting rod 52, the first connecting rod 51 and the bucket 2 are interlocked and the bucket 2 returns to the storage position, as shown in FIGS. 1 to 3.

During the lifting of the handle 3, the second locking member 62 is rotated upwardly along with the main bar 32, and in a case where the handle 3 continues to be lifted up when the second locking member 62 is moved to a position in which the second locking member 62 is in contact with the locking flap 611, the locking flap 611 rotates upwardly by pulling the second locking member 62, and the locking flap 611 keeps contact with the guide surface of the second locking member 62 by an elastic force of the tension spring 63 and slides in the direction of the locking slot 6211. When the locking flap 611 reaches the opening of the locking slot 6211, the locking flap 611 moves downwardly and is caught into the locking slot 6211 under the action of the elastic force of the tension spring 63 to form a locking between the first locking member 61 and the second locking member 62, that is, to form a locking between the handle 3 and the carriage 1.

During the discharging and the returning, power is transmitted through the first ratchet teeth surface 5211 and the second ratchet teeth surface 3321 which are transmissively connected between the main bar 32 and the second connecting rod 52 by operating the handle 3, the power is ingeniously transmitted to the planar linkage mechanism constituted by the carriage 1, the bucket 2 and the double connecting rod assembly 5, and the switching of the bucket 2 between the storage position and the discharge position is achieved by the interlock of the planar linkage mechanism.

The freight cart of the present invention has the following advantages: 1. an operator applies a force naturally and symmetrically and performs the discharging and returning operations easily and effortlessly; 2. in the discharging and returning operations, the operator and the freight cart firmly remain in their original positions, hence operating activities are reduced, time is shortened, and it is ensured that the freight can be discharged from the bucket smoothly and safely.

Embodiment 2

The present embodiment differs from Embodiment 1 in that only the front wheel assembly is provided on the carriage, the front wheel assembly includes at least one wheel, and the rear wheel assembly is replaced with a support hook that can ensure stable parking of the whole cart during loading and discharging.

Embodiment 3

The present embodiment differs from Embodiment 1 in that the front wheel assembly on the carriage includes only one wheel or the rear wheel assembly on the carriage includes only one wheel.

Those described above are just specific embodiments of the present invention and the present invention is not limited thereto. From the technical disclosure of the present invention, any person skilled in the art will be able to easily think of variations or substitutions that will be covered within the technical scope of the present invention. Therefore, the scope of the present invention should be coincident with the scope defined by the appended claims.

What is claimed is:

1. A freight cart comprising a carriage (1) as well as a bucket (2) and a handle (3) which are respectively located on front and rear sides of the carriage (1), characterized in that the bucket (2) is pivotally connected to the carriage (1), a double connecting rod assembly (5) for driving the bucket (2) to rotate relative to the carriage (1) is also provided on the carriage (1), the double connecting rod assembly (5) is pivotally connected to the bucket (2) and the carriage (1) respectively and forms a linkage mechanism together with the bucket (2) and the carriage (1), the handle (3) is transmissively connected to the double connecting rod assembly (5), and the handle (3) is operated to make the linkage mechanism drivable to rotate the bucket (2) relative to the carriage (1) and switch the bucket (2) between a storage position and a discharge position, wherein the freight cart further comprises a locking mechanism, the locking mechanism includes a first locking member (61) and a second locking member (62), and wherein the first locking member (61) is pivotally connected to the carriage (1), and the second locking member (62) is fixed relative to the handle (3).

2. The freight cart according to claim 1, characterized in that the handle (3) is connected to the double connecting rod assembly (5) by a main bar (32).

3. The freight cart according to claim 2, characterized in that the double connecting rod assembly (5) includes a first connecting rod (51) and a second connecting rod (52) pivotally connected to each other.

4. A freight cart comprising a carriage (1) as well as a bucket (2) and a handle (3) which are respectively located on front and rear sides of the carriage (1), characterized in that the bucket (2) is pivotally connected to the carriage (1), a double connecting rod assembly (5) for driving the bucket (2) to rotate relative to the carriage (1) is also provided on the carriage (1), the double connecting rod assembly (5) is pivotally connected to the bucket (2) and the carriage (1) respectively and forms a linkage mechanism together with the bucket (2) and the carriage (1), the handle (3) is transmissively connected to the double connecting rod assembly (5), and the handle (3) is operated to make the linkage mechanism drivable to rotate the bucket (2) relative to the carriage (1) and switch the bucket (2) between a storage position and a discharge position;

wherein the handle (3) is connected to the double connecting rod assembly (5) by a main bar (32), wherein the double connecting rod assembly (5) includes a first connecting rod (51) and a second connecting rod (52) pivotally connected to each other, and wherein the double connecting rod assembly (5) has two double connecting rod assemblies which are disposed symmetrically, and the main bar (32) has two main bars which respectively correspond to the two double connecting rod assemblies (5).

5. The freight cart according to claim 1, characterized in that the locking mechanism is used to lock all of kinematic pairs of the linkage mechanism when the bucket (2) is in the storage position.

6. The freight cart according to claim 5, characterized in that the locking mechanism further includes a locking flap (611) provided on the first locking member (61), a locking slot (6211) cooperating with the locking flap (611) being provided in the second locking member (62), the locking flap (611) being caught in the locking slot (6211) to implement locking between the first locking member (61) and the second locking member (62) when the bucket (2) is located in the storage position, and the first locking member (61) being operated to rotate about a pivotal shaft penetrating the first locking member (61) to enable the locking flap (611) to come out of the locking slot (6211) and unlock the locking between the first locking member (61) and the second locking member (62).

7. The freight cart according to claim 6, characterized in that a guide surface for guiding return of the locking flap (611) is also provided on the second locking member (62), and the guide surface is connected to an opening of the locking slot (6211).

8. The freight cart according to claim 5, characterized in that a stopper (131) for stopping rotation of the first locking member (61) and an elastic piece for driving the first locking member (61) to return are also provided on the carriage (1).

9. The freight cart according to claim 5, characterized in that a support part (132) which supports a free end of the bucket (2) when the bucket (2) is located in the storage position is also provided on the carriage (1).

10. A method of performing a discharging operation by use of the freight cart according to claim 1, comprising:

pushing the freight cart to the discharge position and ensuring that the freight cart is stably parked in the discharge position;

pulling the first locking member (61) upwardly to release a locking flap (611) from a locking slot (6211) of the second locking member (62) and to unlock locking between the first locking member (61) and the second locking member (62);

continually pressing down the handle (3) to drive a main bar (32) to rotate downwardly so that a second connecting rod (52), a first connecting rod (51) and the bucket (2) are interlocked and the bucket (2) is inclined forwardly to reach the discharge position; and keeping the bucket (2) in the discharge position until freight in the bucket (2) is completely discharged from the bucket (2) and finishing the discharging.

* * * * *